March 6, 1934.  H. BLANK  1,950,160
DISPENSER FOR MUSTARD AND THE LIKE
Filed April 22, 1933
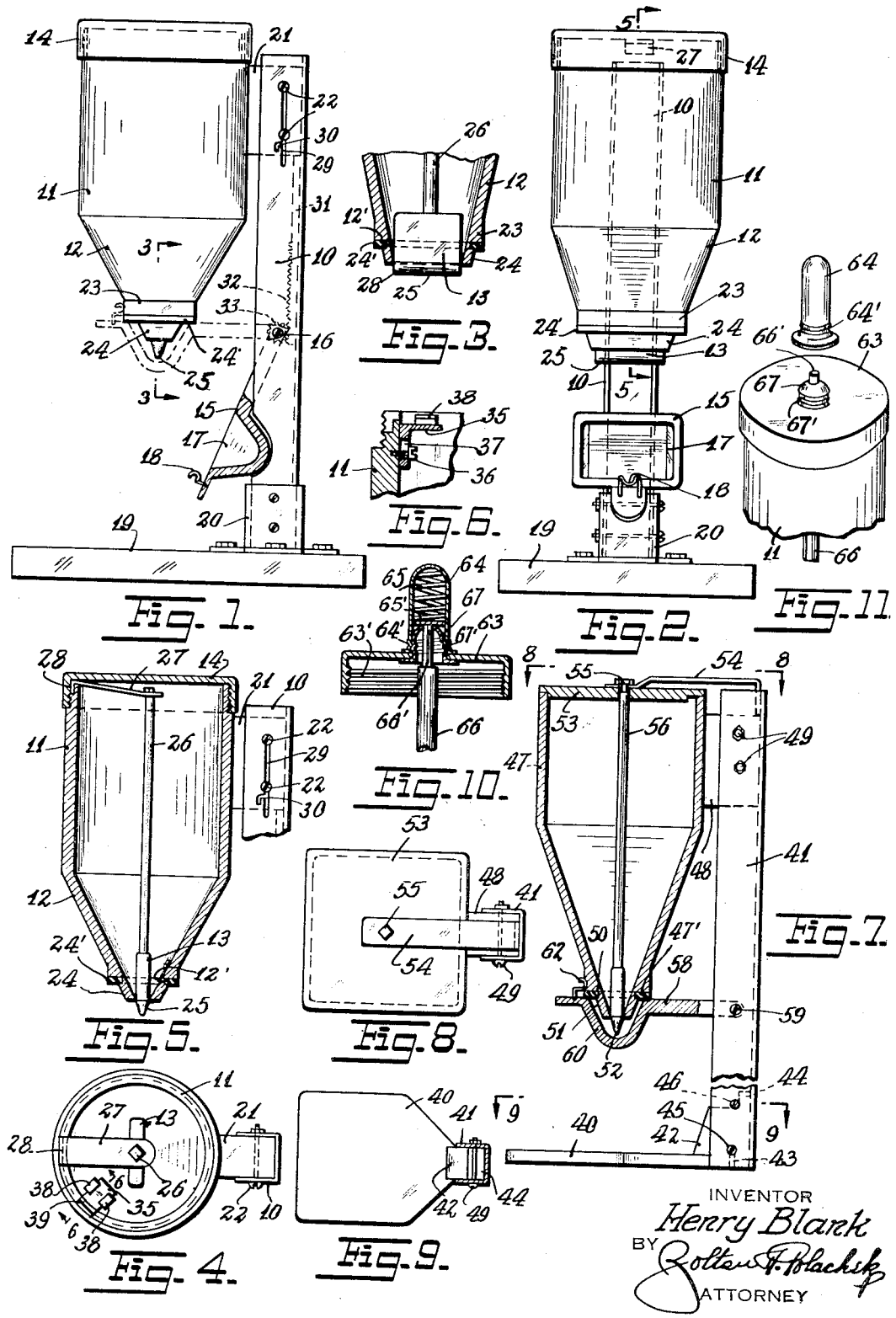
INVENTOR
Henry Blank
BY Zoltan F. Blachik
ATTORNEY Patented Mar. 6, 1934

1,950,160

UNITED STATES PATENT OFFICE 1,950,160

DISPENSER FOR MUSTARD AND THE LIKE

Henry Blank, North Bergen, N. J.

Application April 22, 1933, Serial No. 667,361

11 Claims. (Cl. 65—45)

This invention relates to new and useful improvements in a mustard dispenser.

The invention has for an object the construction of a device as mentioned which is characterized by a mustard container supported upon a stand and having a bottom discharge, a valve arranged in the mouth of the discharge manually movable upwards by engaging the food against the bottom of the mouth so that the mustard is automatically engaged upon the food.

Still further, the invention contemplates a novel arrangement of providing the mustard container with a removable cover at the top so that it may be filled when necessary.

Still further, as another object of this invention, an arrangement is proposed whereby a spring is mounted within the mustard container and removably held by said cover and connected for urging the valve, previously mentioned, into an extended position.

The invention still further contemplates the provision of a novel cover movably arranged upon said stand and adapted to engage and close the bottom of said mustard container.

Still further, the invention contemplates a novel arrangement for holding the spring which actuates the valve in a manner so that its tension may be varied to accomplish proper discharging of the mustard.

Another one of the objects of this invention is the arrangement of a removable cover upon the mustard container and a spring which has the simultaneous function of maintaining the cover in place and urging the valve of the mustard container into closing position.

As another one of the objects of this invention, it is proposed to construct the stand of the device with a removable base portion.

Still further, the invention has for an object the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of a mustard dispenser constructed according to this invention.

Fig. 2 is a front elevational view of Fig. 1.

Fig. 3 is a fragmentary sectional view taken on the line 3—3 of Fig. 1.

Fig. 4 is a plan view of Fig. 1 shown with the removable cover of the mustard container removed.

Fig. 5 is a fragmentary vertical sectional view taken on the line 5—5 of Fig. 2.

Fig. 6 is a fragmentary sectional view taken on the line 6—6 of Fig. 4.

Fig. 7 is a side elevational view, partly shown in section of a mustard dispenser constructed according to a modification of the invention.

Fig. 8 is a plan view of Fig. 7 seen as though looking in the direction of the line 8—8 Fig. 7.

Fig. 9 is a horizontal sectional view taken on the line 9—9 of Fig. 7.

Fig. 10 is a vertical sectional view of a cover for the mustard container shown with a provision for actuating the valve.

Fig. 11 is a perspective view of the device shown in Fig. 10.

The mustard dispenser according to this invention comprises a stand including a vertical element 10. A mustard container 11 is supported upon the vertical element 10 and has a bottom discharge 12 containing a discharge control valve 13. A cover 14 is removably engaged upon the top of the container 11 so that mustard may be placed within the container when desired. A closure element 15 for closing the discharge end of the mustard container is pivotally mounted at its rear end 16 upon the vertical element 10 and at the front end is provided with a pocket portion 17 adapted to encase the discharge end of the mustard container. Furthermore, the closure element 15 is adapted to assume a position indicated by the dot and dash lines in Fig. 1, in which the mustard container is closed, or another position shown in full lines in which the container is ready for use. A catch 18 is arranged upon the front end of the closure element 15 and is adapted to engage against the side of the discharge end of the mustard container so as to frictionally hold the closure element in its closed position.

The stand comprises a base plate 19 upon which a bracket 20 is mounted. The vertical element 10 is in the form of a channel member which has its lower end engaged within the bracket 20. Preferably, the mustard container 11 would be of circular cross section as illustrated in Fig. 4 though other forms may be used, for example, a square cross section as shown in Fig. 8 or any other convenient arrangement. A lug 21 is attached upon and projects from one side of the container 11 and engages in between the arms of the vertical element 10. A pair of bolts 22 engage through the arms of the vertical element 10 and through the lug 21, to accomplish attachment of the container upon the stand. The discharge end of the container is formed with a neck piece 23 which terminates in a nozzle 24. The inner walls of the nozzle converge towards each other so that the extreme end engages tightly against the sides of the valve 13. The extended end of the valve 13 is formed with tapered rounded corners 25 arranged so as to allow discharge of the mustard when the valve is forced inwards so that its bottom face is substantially flush with the bottom of the nozzle 24.

A rubber washer 24' is inserted in an annular groove 12' in the bottom discharge 12 of the container 11 to act as a bumper or shock absorber when the closure element 15 is turned to shutting position.

A stem 26 is attached upon the valve 13 and serves to hold the valve in place. The upper end of the stem 26 is attached upon a flat spring 27 which has a bent end 28 engaging within a recess formed in the top edge of the container 11. The cover 14 threadedly engages upon the container in such a manner that the edge 28 of the spring is clamped in position under the cover 14, therefore, while closing the container, the cover simultaneously serves to hold the spring 27 in its operative position.

The bolts 22 supporting the mustard container 11 in place engaged through vertical slots 29 formed in the arms of the channel vertical element 10 so that the mustard container may be moved vertically within certain limits. The slots 29 are provided with intermediate side branches 30 arranged so that when the mustard container 11 is moved into raised position, it may be tilted outwards to cause the lower bolt 22 to engage into the branch slots and hold the container in the lifted position. The bolts 22 engage through apertures in the lug 21 so as to be fixed relative to the lug. The heads of the bolts are larger than the widths of the slots 29 so that the container may not be accidentally displaced.

A rod 31 projects from the lug 21 and runs along within the channel element 10 and at the lower end has rack teeth 32 meshing with a pinion 33 fixed upon the pivot 16 of the closure element 15. When the container 11 is lifted as allowed by the slots 29, the rack teeth 32 will turn the pinion 33 and cause automatic opening of the closure element 15. When the container 11 is released, gravity will draw it down into its lower position and the closure element 15 will automatically close the discharge end of the mustard container.

In operation food upon which mustard is to be applied, is forced against the extended end of the valve 13 so as to force the valve upwards to a position in which some of the mustard from within the container may discharge upon the food. The amount of discharge of mustard will be controlled by the swiftness with which the valve 13 is caused to move upwards and also by the distance which the valve 13 maintains when the food is in intimate contact with the bottom edge. The discharge may be controlled by adjusting the tension of the spring 27. Variation is possible by reason of a block 35, adjustably mounted upon the inside of the container 11 near the top edge. A screw 36 engages through an elongated slot 37 in in the block and threadedly engages through the container 11 and constitutes the means by which the block may be vertically adjusted. A pair of opposed fingers 38 project from the top face of the block and are adapted to receive the spring 27. The block 35 is mounted immediately adjacent a recess 39 formed in the upper edge of the container 11 so as to provide for the bent end 28 of the spring 27. To vary the tension of the spring 27, the cover 14 must first be removed and then the spring 27 lifted from its position shown upon the drawing and shifted to a position in which it engages between the fingers 38 and in which the bent end 28 engages into the recess 39. Furthermore, the tension may be varied by changing the vertical position of the block 35. Then when the cover 14 is re-engaged in place, the operation of the valve 13 will be such as predetermined.

In Figs. 7, 8 and 9, a modified construction has been illustrated in which the mustard dispenser comprises a stand consisting of a base 40 and a vertical channel shaped element 41. The base 40 has a block 42 upon one side adapted to engage in between the arms of the channel 41. This block is formed with a transverse slot 43 communicating with the bottom side and extending from side to side. It is also formed with a top lip 44 extending from side to side. A pair of bolts 45, 46 are engaged through the arms of the channel 41 in such a manner as to hold the base plate in position. The base plate may be removed by merely removing the bolt 46 so that it may be lifted upwards, free from the bolt 45. It may be replaced in a converse fashion.

A mustard container 47 is provided with a side lug 48 which engages in between the arms of the channel element 41. Several bolts 49 serve to permanently attach the container upon the vertical element. The lower end of the container is formed with a discharge nozzle 51 through which the valve 52 operates. A rubber washer 47' is inserted in an annular groove 50 in the discharge collar 51. The container is opened at the top and provided with a cover 53 which merely rests upon the top of the container, to close it. A spring 54 is attached upon the vertical element 41 and engages against the top side of the cover 53 to hold it in the closed position.

This spring is also connected with the upper reduced end 55 of a stem 56 which is connected with the valve 52. Thus the valve 52 may be forced upwards against the restraining action of the spring 54 when food is engaged against the discharge mouth of the mustard container. Similarly, the cover 53 may be raised sufficiently from the top of the container, by merely flexing the spring 54 so that mustard may be filled in the device to replenish its supply. A closure element 58 is pivotally mounted at one end 59 upon the vertical element 41 and its other end is provided with a pocket portion 60 adapted to engage over and cover the lower end of the mustard container. A catch 62 is mounted upon the closure element and is adapted to engage against the side of the neck of the container to hold the closure element in the closed position.

In Fig. 10 another modified form of the invention has been disclosed in which a cover 63 for a mustard container has been illustrated which is provided with threads 63' for attachment on the container 11 and with a top knob 64 by which it may be conveniently rotated. A helical spring 65 and a disc 65' are placed in the knob 64. Disc 65' may be interchanged with thicker discs so as to change the tension of the spring 65. The lower end of knob 64 is threaded as at 64' and is adapted to engage the threads 67' of a guide nipple 67 which protrudes outwardly from the cover 63. The nipple 67 is provided with an aperture through which a reduced end 66' of a stem 66 is allowed to slide and engage the bottom face of disc 65'. The helical spring 65 applies a constant pressure on disc 65' which is engaged by the reduced end 66' of the stem 66 which connects with the valve of a mustard dispenser, as previously explained, for example, the valve 13 or the valve 52. The spring 65 is depended upon to keep the valve in a closed position.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A mustard dispenser, comprising a stand including a vertical element, a mustard container supported upon said stand and having a bottom discharge mouth with a projecting valve adapted to be raised when food is engaged thereagainst to control a discharge of mustard upon said food, and a closure element for simultaneously covering the discharge mouth and the valve when said valve is in its lowered position.

2. A mustard dispenser, comprising a stand including a vertical element, a mustard container supported upon said stand and having a bottom discharge mouth with a projecting valve adapted to be raised when food is engaged thereagainst to control a discharge of mustard upon said food, and a closure element for simultaneously covering the discharge mouth and the valve when said valve is in its lowered position, and a catch for holding said closure element in its closed position.

3. A mustard dispenser, comprising a stand including a vertical element, a mustard container supported upon said stand and having a bottom discharge mouth and a valve extending through said discharge mouth, a closure element for closing the discharge end of said container, and a discharge collar mounted upon the lower end of the discharge element and said discharge element having converging inner sides, the lower inner edges of said discharge elements being in intimate contact with sides of the valve, and the extended end of the valve being provided with tapered and rounded corners to facilitate the discharge of mustard.

4. A mustard dispenser, comprising a stand including a vertical element, a mustard container supported upon said stand and having a bottom discharge mouth and a valve operating in said discharge mouth, a resilient member attached to and above said discharge mouth and a closure element butting against said resilient member for closing the discharge end of said container, said closure element being formed with a pocket adapted to engage and close the discharge end of said mustard container.

5. A mustard dispenser, comprising a stand including a vertical channel shaped member, a mustard container having a side lug engaged between the arms of said channel, bolts engaged through said lug and engaging vertical slots in the arms of said channel so as to be vertically movable, the lower end of said container being formed with a discharge mouth, a valve resiliently mounted in said mouth to control the discharge of mustard, a closure element pivotally mounted upon said vertical element and adapted to assume a position to close said discharge, a pinion fixed upon the pivot of said closure element, and a rack meshing with said pinion and connected with said lug.

6. A mustard dispenser, comprising a stand including a vertical channel shaped member, a mustard container having a side lug engaged between the arms of said channel, bolts engaged through said lug and engaging vertical slots in the arms of said channel so as to be vertically movable, the lower end of said container being formed with a discharge mouth, a valve resiliently mounted in said mouth to control the discharge of mustard, a closure element pivotally mounted upon said vertical element and adapted to assume a position to close said discharge, a pinion fixed upon the pivot of said closure element, and a rack meshing with said pinion and connected with said lug, the vertical slots in the arms of said channel being formed with intermediate side branches so that the mustard container may be held in a raised position.

7. In a mustard dispenser, a mustard container, having a bottom discharge mouth, a valve slidably mounted in said mouth, a stem connecting with said valve and extending over the top of said container, and a cover engaged upon said container serving to close the container, and a spring connected with said stem and acting against said cover for urging the stem downwards and simultaneously holding the cover down.

8. In a mustard dispenser, a mustard container, having a bottom discharge mouth, a valve slidably mounted in said mouth, a stem connecting with said valve and connected with a spring extending over the top edge of said container, and a cover engaged upon said container serving to close the container and simultaneously hold the spring, a block slidably mounted within said container near the top edge, said block being formed with opposed fingers adapted to engage the edges of said spring and hold the spring in various positions so as to control the operative tension of the valve.

9. A mustard dispenser, comprising a stand including a vertical element, a mustard container supported upon said stand and having a bottom discharge mouth and an open top, a cover engaged upon said top, a valve engaged into said discharge mouth and having a stem extending through said container and a spring mounted upon said vertical element and connected with the upper end of said stem and engaging against said cover to hold the cover in place.

10. A mustard dispenser, comprising a stand including a vertical element, a mustard container supported upon said stand and having a bottom discharge mouth and an open top, a cover engaged upon said top, a valve in said discharge mouth and connected with a stem extending into said container and through said cover, and a spring mounted upon said vertical element and connected with the upper end of said stem and engaging against said cover to hold the cover in place, said stand including a removable base element.

11. A mustard dispenser, comprising a stand including a vertical element, a mustard container supported upon said stand and having a bottom discharge mouth and an open top, a cover engaged upon said top, a valve in said discharge mouth and connected with a stem extending into said container and through said cover, and a spring mounted upon said vertical element and connected with the upper end of said stem and engaging against said cover to hold the cover in place, and a closure element pivotally mounted upon said vertical element and adapted to close the discharge of said container.

HENRY BLANK.